US007000741B2

(12) United States Patent
Baumann et al.

(10) Patent No.: US 7,000,741 B2
(45) Date of Patent: Feb. 21, 2006

(54) SELF-BOOSTING ELECTROCHEMICAL VEHICLE BRAKE

(75) Inventors: Dietmar Baumann, Hemmingen (DE); Dirk Hofmann, Ludwigsburg (DE); Herbert Vollert, Vaihingen/Enz (DE); Willi Nagel, Remseck/Hochdorf (DE); Andreas Henke, Diemelstadt (DE); Bertram Foitzik, Ludwigsburg (DE); Bernd Goetzelmann, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/011,378

(22) Filed: Dec. 15, 2004

(65) Prior Publication Data
US 2005/0139436 A1    Jun. 30, 2005

(30) Foreign Application Priority Data
Dec. 24, 2003   (DE) ................................ 103 61 296

(51) Int. Cl.
*F16D 55/14* (2006.01)
(52) U.S. Cl. ..................................... 188/71.4; 188/72.2
(58) Field of Classification Search ............... 188/71.3, 188/71.4, 72.7–72.8, 156–164, 135, 138, 188/140 R, 140 A, 72.2, 264 R, 18 A, 18 R, 188/73.46, 71.2, 72.1, 71.6; 180/65.1–65.8, 180/165; 310/67 R, 68 B, 93, 103; 318/139; 192/35, 40, 84.91
See application file for complete search history.

(56) References Cited

U.S. PATENT DOCUMENTS

| | | | | |
|---|---|---|---|---|
| 1,696,879 A | * | 12/1928 | Chase | 188/138 |
| 1,869,876 A | * | 8/1932 | Apple | 188/164 |
| 2,649,941 A | * | 8/1953 | Doebeli | 192/35 |
| 2,801,719 A | * | 8/1957 | Clerk | 192/35 |
| 3,633,714 A | | 1/1972 | Klaue | |
| 3,651,895 A | * | 3/1972 | Whitfield | 188/71.6 |
| 3,792,742 A | * | 2/1974 | Mager | 180/65.5 |
| 4,862,998 A | * | 9/1989 | Campbell et al. | 188/71.6 |
| 6,321,884 B1 | * | 11/2001 | Balz | 188/161 |
| 6,768,932 B1 | * | 7/2004 | Claypole et al. | 700/279 |
| 2004/0200676 A1 | * | 10/2004 | Chang et al. | 188/72.8 |

FOREIGN PATENT DOCUMENTS

EP    0 361 864 A1    4/1990

* cited by examiner

*Primary Examiner*—Chris Schwartz
(74) *Attorney, Agent, or Firm*—Ronald E. Greigg

(57) ABSTRACT

A self-boosting, electromechanical friction brake having with a fixed, drumlike brake body in which two rotatable brake rings are disposed, which are rotatable counter to one another via a planetary gear and can be spread apart thereby. As a result of being spread apart, the brake rings are pressed from inside against the brake body and are braked. The friction brake may be sealed off and thus protected it against environmental factors. A lubricant filling is possible, which reduces wear and as a result makes a lifetime brake possible. The brake may be cooled through coolant channels which can be connected via connections to a coolant circulation system of an internal combustion engine of a motor vehicle.

9 Claims, 2 Drawing Sheets

SELF-BOOSTING ELECTROCHEMICAL VEHICLE BRAKE

BACKGROUND OF THE INVENTION

1. Field of the Invention

The invention relates to a self-boosting electromechanical vehicle brake.

2. Description of the Prior Art

A mechanically actuated self-boosting friction brake is disclosed in European Patent Disclosure EP 299 593 A1. The known friction brake is embodied as a multiple disk brake, with a number of coaxially disposed friction disks, which for braking can be pressed by an actuating device against a brake body, which may also be embodied in multiple parts. The friction disks can also be called friction braking elements. In the known friction brake, the brake body has a drumlike housing, which forms a reservoir for a coolant and/or lubricant fluid. The terms friction braking element and brake body are intended here to refer in general to elements of a brake of which one is fixed and the other is rotatable and which are pressed against one another for braking, so that the fixed element brakes the rotatable element by friction.

The actuating device of the known friction brake has two spreader rings, which are disposed coaxially next to one another and coaxially to the friction disks between two of the friction disks. On end faces oriented toward one another, the spreader rings have rampways, in which balls, as roller bodies, rest. The rampways extend in the circumferential direction, and their depth increases in both circumferential directions; that is, the rampways rise in both circumferential directions. For actuation, the spreader rings are rotated counter to one another, causing the balls to roll in the rampways. Because of the upward slope of the rampways, the balls press the spreader rings apart in the process. As a result, the spreader rings, which can be thought of as parts of the brake body, are pressed against of two of the friction disks, which in turn are pressed against further parts of the brake body, in particular against the housing, and as a result are braked.

When pressed upon, the rotating friction disks exert a frictional force on the spreader rings in the direction of rotation, and this force urges the spreader rings in the actuation direction. As a result, a moment is exerted on the spreader disks that increases their rotation and hence the spreading force and pressure force. The spreader rings, which form part of the actuating device, thus at the same time form a self-boosting device, which converts a frictional force, exerted on it by the friction disks that form the friction braking elements, into a pressure force and as a result increase the braking force.

OBJECT AND SUMMARY OF THE INVENTION

Unlike conventional friction brakes, in the friction brake of the invention, the brake body is fixed and the friction braking element or elements, the self-boosting device, and at least some parts of the actuating device are rotatable and are braked upon actuation of the brake by the pressing against one another of the friction braking element or elements and the brake body. Thus unlike conventional friction brakes, a brake body, namely a brake drum or a brake disk, does not rotate with a vehicle wheel; instead, the friction braking elements (friction brake linings), the self-boosting device, and the actuating device rotate with a vehicle wheel that is to be braked. The actuating device need not entirely rotate; it may have some fixed parts. The advantages of the invention are that the fixed brake body can be embodied as a housing, for instance in the form of a brake drum, which protects moving parts of the friction brake against becoming soiled. The housing can be hermetically sealed, and as a result, virtually unaltered conditions prevail at the friction partners of the friction brake. In particular, there is only slight fluctuation in the coefficient of friction between the friction partners, because they are not acted upon by water, moisture and dirt. In self-boosting brakes, this has the advantage that the selected self-boosting can be closer to a brake locking limit, without having to fear brake locking from an increase in the coefficient of friction. As a result, the friction brake can be designed with stronger self-boosting and requires less actuation force. Another advantage of hermetic sealing is that the braking action remains unaffected when driving through water, for instance, and as a result the friction brake is especially well suited to all-terrain vehicles or the increasingly popular sport utility vehicles (SUVs) that have off-road capabilities. Another advantage of a fixed brake body embodied as a housing is the possibility of liquid cooling; for instance, the friction brake can be connected to a coolant circulation system of an internal combustion engine.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENT

Figure 1:
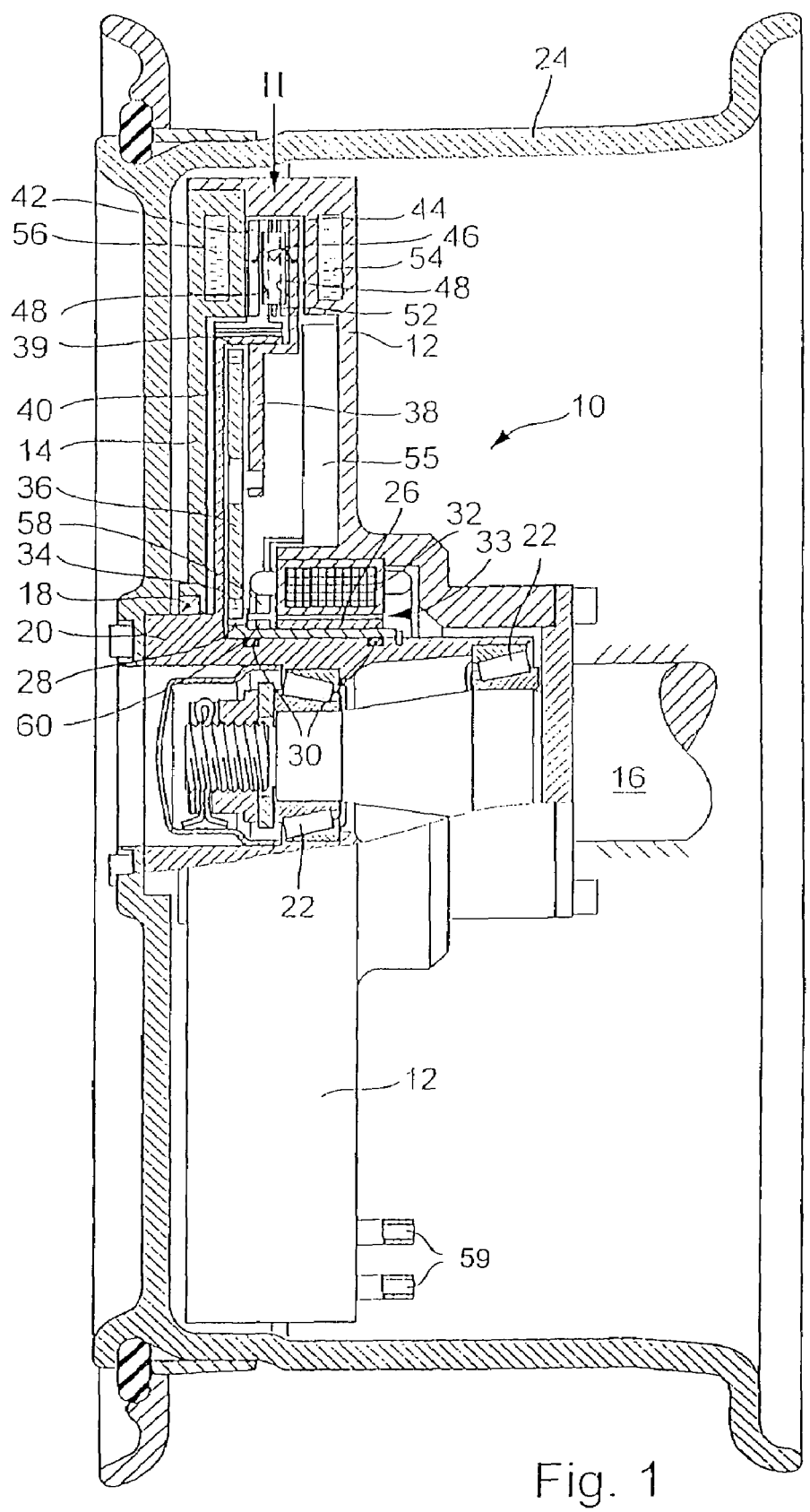
FIG. 1 shows a friction brake of the invention, looking radially, in a partly cutaway view.

The friction brake 10 of the invention, shown in the drawing, has a drumlike housing 12 with a housing cap 14. The housing 12 is seated in a fixed fashion, that is, in particular in a manner fixed against relative rotation, on a shaft journal 16 of a vehicle wheel, in particular a front wheel of a passenger car not otherwise shown. The housing cap 14 is seated on the housing 12 in sealed fashion and is sealed off with a sealing ring 18 at a tubular wheel hub 20. The housing 12 is thus hermetically sealed. The wheel hub 20 is rotatably supported on the shaft journal 16 in the usual way with wheel bearings 22. A wheel rim 24 is bolted to the wheel hub 20. The housing 12 with the cap 14 forms a brake body of the friction brake 10; unlike brake drums of conventional drum brakes, the housing 12 is fixed against relative rotation to the shaft 14, or in other words does not rotate along with a vehicle wheel or with the rim 24.

The parts of the friction brake 10 described below are located inside the housing 12, which is hermetically sealed off with the cap 14. The parts of the friction brake 10 are therefore not exposed to environmental factors. This has the advantage of an at least nearly constant coefficient of friction between brake rings 42, 44 and the housing. 12 and cap 14, which form the friction partners of the braking rings 42, 44. Factors that greatly influence the coefficient of friction, such as dryness or wetness and dirt, are precluded. Of itself, this is already an advantage. A particular advantage is the constant coefficient of friction, because of the self-boosting, which is to be explained hereinafter and is dependent on the coefficient of friction, of the friction brake 10.

Inside the housing 12, a rotor 28 having permanent magnets 26 is seated rotatably with bearing rings 30 on the wheel hub 20. The rotor 28 cooperates with a stator 32, which is disposed in fixed fashion in the housing 12, annularly surrounding the rotor 28. The rotor 28 and stator 32 form an electric motor 33 of an electromechanical actuating device, otherwise to be explained further below, of the friction brake 10. The electric motor 33 is embodied as a so-called hollow-shaft motor, but this is not compulsory. To economize on radial installation space, the electric motor 33 may, unlike what is shown, be disposed laterally offset from the wheel bearings 22 and as a result (not shown) can be embodied with a smaller diameter.

The rotor 28 has a gear ring, which forms a sun gear 34 of a planetary gear that is part of the electromechanical actuating device of the friction brake 10. The sun gear 34 meshes with planet gears 36, which are supported rotatably on a planet carrier 38. The planet gears 36 mesh with a ring gear 39, which is embodied as internal toothing of a carrier plate 40. The carrier plate 40 is integral with the wheel hub 20; it protrudes away from the wheel hub 20 in a radial plane in the manner of a flange. The planet gears 36 are located between the carrier plate 40 and the planet carrier 38.

The carrier plate 40 and the planet carrier 38 each carry one braking ring 42, 44, which are connected to the carrier plate 40 and the planet carrier 38, respectively, in a manner fixed against relative rotation. The brake rings 42, 44 are circular-annular disks that protrude radially outward from the carrier plate 40 and the planet carrier 38, respectively. There is an axial spacing between the brake rings 42, 44. The housing 12 and the housing cap 14, respectively, are located on outer sides, facing away from one another, of the brake rings 42, 44, forming an air gap between each of the brake rings 42, 44 and the housing 12 and housing cap 14, respectively. Spring elements 46 pull the brake rings 42, 44 together and, when the friction brake 10 is unactuated, lift them away from the housing 12 and housing cap 14 that form the brake body. The braking rings 42, 44 form friction braking elements, which for braking are pressed axially apart and from the inside against the housing 12 and the housing cap 14 that form the brake body.

The planetary gear having the sun gear 34, planet carrier 38, planet gears 36, and ring gear 39 makes for a single-stage planetary gear for the actuating device of the friction brake 10. In principle, a multi-stage planetary gear is also possible. If something other than a planetary gear is used, care should be taken to assure that the selected gear has no imbalance relative to the shaft journal 16, since the gear rotates with the rim 24.

Figure 2:
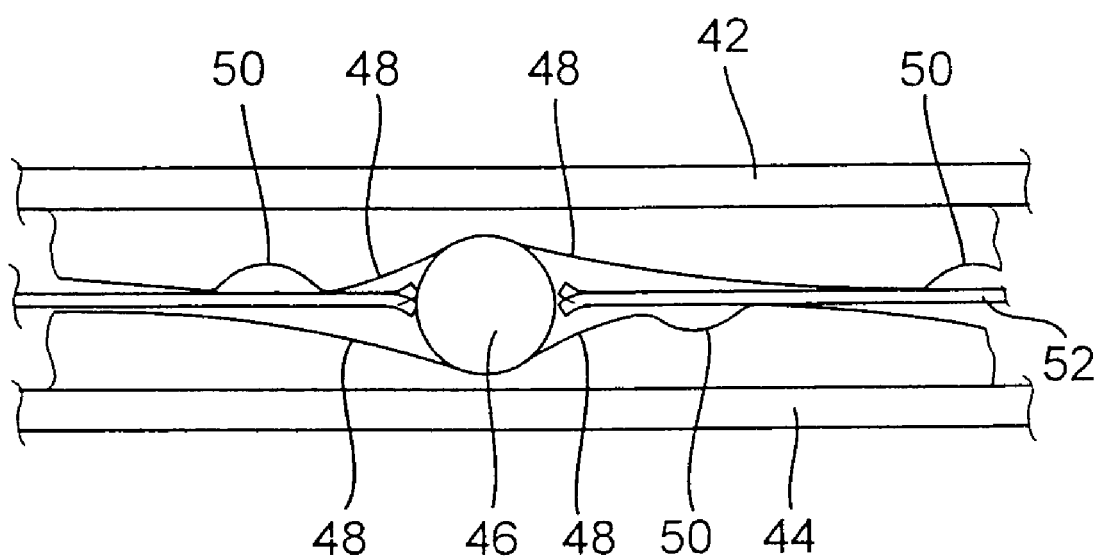
FIG. 2 shows a ramp mechanism of a self-boosting device of the friction brake of FIG. 1, looking in the direction of the arrow II in FIG. 1.

On insides oriented toward one another, the brake rings 42, 44 have ramps 48, on which cylindrical roller bodies 46 are disposed. The cylindrical shape of the roller bodies 46 is not compulsory; for instance, the roller bodies may also be balls (not shown). The roller bodies 46 roll on the ramps 48 shown in FIG. 2. FIG. 2 shows a view radially to the shaft journal 16 from outside onto the brake rings 42, 44, the ramps 48, and one face end of one of the cylindrical roller bodies 46. The intrinsically curved circumferential faces of the brake rings 42, 44 and ramps 48 that can be seen in FIG. 2 are shown in a developed view in one plane. The ramps 48 extend in a circumferential and rotational direction of the brake rings 42, 44. The ramps 48 rise from the outset position, shown in FIG. 2, of the roller body 46; that is, their spacing from one another becomes less. The upward slope of the ramps 48 is initially great, and with increasing distance from the outset position of the roller body 46, the slope decreases. As a result, at the onset of a brake actuation, a major movement into position is attained, and at the end of the brake actuation, a strongly pronounced self-boosting is attained. The ramps 48 of the two brake rings 42, 44 are axially symmetrical to an imaginary axis of the roller bodies 46; their upward slope and their course differ in the two directions, resulting in self-boosting of different magnitudes in travel forward as opposed to in reverse. To embody the friction brake 10 as a parking brake, dishlike indentations 50 are provided in the ramps 48 that are provided for braking while traveling in reverse. The roller bodies 46 are distributed over the circumference of the brake rings 42, 44, and a roller body cage 52 keeps the roller bodies 46 in their spacing from one another. The roller body cage 52 is a sheet-metal part, comparable to a ball cage in a ball bearing. The ramps 48 repeat on each roller body 46; at the top right in FIG. 2, an indentation 50 can be seen, which represents the end of a ramp 48, no longer visible in FIG. 2, for the next roller bodies 46 in the circumferential direction, which can likewise no longer be seen. The ramps 48 and roller bodies 46 form a self-boosting device of the friction brake 10.

An electronic control unit 55 for controlling or regulating a braking force of the friction brake 10 is accommodated in the housing 12. The electronic control unit 55 is connected to an on-board electrical system of a motor vehicle, not shown, that is equipped with the friction brake 10. The electronic control unit 55 furthermore has its own energy-storing means, for instance in the form of an accumulator or a capacitor, so that the friction brake 10 can be actuated even independently of the on-board electrical system of the motor vehicle.

In the region of the brake rings 42, 44, the housing 12 and the cap 14 have coolant channels 54, 56. The coolant channels 54, 56 are embodied as circular-annular hollow chambers, extending all the way around, with a flat rectangular cross section. For braking, the brake rings 42, 44 are pressed against walls, oriented toward them, of the coolant channels 54, 56. Via connection lines 59, the coolant channels 54, 56 are connected to a coolant circulation system of an internal combustion engine of the motor vehicle, not shown. Aside from the capability of cooling the friction brake 10, the connection to the coolant circulation system of the motor vehicle also has the advantage that the heat of friction of the friction brake 10 can be used to heat the motor vehicle. Typically, the heat of friction of the brake is available faster than engine heat when a motor vehicle is started in the morning. Moreover, in modern direct-injection Diesel engines, the engine heat may not be adequate to heat an interior of the vehicle. The possibility of cooling the friction brake 10 has the advantage that fading, that is, a lessening braking action in the event of excessive heating of the friction brake 10, can be avoided. Moreover, overheating of a lubricant contained in the housing 12 can be avoided.

The hermetic sealing of the housing 12 enables a (partial) filling with a lubricant. A lubricant in the housing 12 that wets the brake rings 42, 44 and the walls cooperating with them of the coolant channels 54, 56 has the advantage of reducing wear, as a result of which a so-called lifetime brake can be achieved in which the brake rings 42, 44 typically do not have to be changed. A readjustment because of wear can also be dispensed with. Another considerable advantage of lubricating the brake rings 42, 44 and the walls cooperating with them of the coolant channels 54, 56 is that fluctuations in the coefficient of friction are minimized. As a result, it is possible to select a self- boosting of the friction brake 10 very near a brake locking limit, or in other words to achieve a strong self-boosting, as a result of which the actuation forces to be exerted by the actuating device are small. The encapsulation of the friction brake 10 by the hermetically sealed housing 12, optionally in conjunction with a lubricant filling, moreover reduces noise development.

To attain a long lifetime of the brake rings 42, 44 and the walls cooperating with them of the coolant channels 54, 56, the brake rings may for instance be selected to be of hardened steel, and the housing 12 and the housing cap 14 to be of an aluminum cast melt with embedded ceramic particles (in a proportion of 20% silicon carbide, the material known for instance as A1-MMC). Coating the surfaces that rub against one another with a wear-resistant material, such as ceramic, is also possible.

With a sensor 58 attached to the housing and a pulse transducer 60 (such as a gear ring) seated on the rotor 28, a rotary speed and in particular a rotary angle of the sun wheel 34 relative to the wheel hub 20 can be defined.

The function of the friction brake 10 of the invention is as follows: When the friction brake 10 is not actuated, the rim 24 rotates with the wheel hub 20, which is rotatably supported on the shaft journal 16. The carrier plate 40 and the planetary gear 34, 36, 38, 39 rotate with the wheel hub 20. The planetary gear 34, 36, 38, 39 does not rotate within itself; that is, the gear wheels 34, 36, 39 and the planet carrier 38 of the planetary gear 34, 36, 38, 39 do not move counter to one another.

For actuation of the friction brake 10, the rotor 28 is slowed down with the sun gear 34. To that end, the electric motor 33 is operated as a generator; that is, the friction brake 10 requires no energy and instead gives off energy. This energy is stored in the energy-storing means of the electronic control unit 55. Only at low rpm is the moment of the electric motor 33 not sufficient in the generator mode; in that case, current must be supplied to the electric motor 33. To that end, and in the event of failure of the external power supply, the energy-storing means of the electronic control unit 55 is used.

Because of the slowing down of the rotor 28 with the sun gear 34, the planetary gear 34, 36, 38, 39 is driven and in the process rotates the brake rings 42, 44 counter to one another. The rotation of the brake rings 42, 44 counter to one another rotates or displaces the ramps 48, mounted on the brake rings 42, 44, counter to one another. The roller bodies 46 roll on the ramps 48 and, because the ramps 48 slope upward, the roller bodies press the brake rings 42, 44 apart and against the walls, oriented toward them, of the coolant channels 54, 56 of the housing 12 and of the housing cap 14. Since the housing 12 and the housing cap 14 are fixed, the brake rings 42, 44 are braked. Via the carrier plate 40 and the planetary gear 34, 36, 38, 39, the brake rings 42, 44 brake the wheel hub 20 and the rim 24 that is bolted onto the wheel hub 20.

The walls of the fixed coolant channels 54, 56 exert a frictional force on the rotating brake rings 42, 44, and this force reinforces the rotation of the brake rings 42, 44 counter to one another. As a result, the pressure force of the brake rings 42, 44 against the walls of the coolant channels 54, 56 and thus a braking force of the friction brake 10 are boosted; self-boosting of the friction brake 10 is attained. The ramps 48 are disposed such that their longer and more shallowly rising flanks, which bring about a greater self-boosting, are used in traveling forward, while the shorter flanks of the ramps 48 are used when traveling in reverse. The indentations 50 are disposed on ends of the shorter flanks, used in reverse travel, of the ramps 48. The rotation of the friction rings 42, 44 counter to one another in the desired direction of rotation that brings about the self-boosting becomes established on its own by the rotation of the rim 24, in the generator mode of the electric motor 33.

To attain a parking brake function, the brake rings 42, 44 are rotated far enough counter to one another that the roller bodies 46 move inside the indentations 50 ("snap into place"). The friction brake 10 automatically stays in this actuated state without being supplied with current. The actuating device actuates the friction brake 10 as both a service brake and a parking brake; no additional brake for the parking brake function is necessary.

The foregoing relates to a preferred exemplary embodiment of the invention, it being understood that other variants and embodiments thereof are possible within the spirit and scope of the invention, the latter being defined by the appended claims.

We claim:

1. A self-boosting, electromechanical friction brake, comprising:
   first and second friction brake elements (42, 44),
   a brake body,
   an electromechanical actuating device, including an electric motor (33), operable to press the first and second friction brake elements (42, 44) against the brake body for braking, and
   a self-boosting device which converts a frictional force, exerted upon pressing of the first and second friction brake elements (42, 44) against the brake body on the first and second friction brake elements (42, 44) by the brake body, into a pressure force, which in addition to a pressure force exerted by the actuating device presses the first and second friction brake elements (42, 44) against the brake body, the self-boosting device comprising ramps (48) on inside of each of the first and second friction brake elements (42, 44) oriented toward one another, on which cylindrical roller bodies (46) are disposed,
   wherein the brake body (12, 14, 54, 56) forms a housing for the friction brake (10) and is fixed and the first and second friction brake elements (42, 44) and the self-boosting device (46, 48) are rotatable within the housing formed by the brake body (12, 14, 54, 56);
   wherein at least a part of the actuating device (26, 34, 36, 38) rotates with the first and second friction brake elements (42, 44) and the self-boosting device (46, 48);
   and wherein the first and second friction brake elements (42,44) and with it the self-boosting device (46, 48) and the actuating device (26, 34, 36, 38) are braked by pressing of the first and second friction brake elements (42, 44) against the brake body (12, 14, 54, 56).

2. The self-boosting electromechanical friction brake in accordance with claim 1, wherein the friction brake (10) is embodied as a parking brake.

3. The self-boosting electromechanical friction brake in accordance with claim 2, wherein the friction brake (10) comprises a common actuating device (26, 32, 34, 36, 38) for both a service brake and the parking brake.

4. The self-boosting electromechanical friction brake in accordance with claim 1, wherein the brake body (12, 14, 54, 56) is sealed.

5. The self-boosting electromechanical friction brake in accordance with claim 1, wherein the friction brake (10) comprises means providing a lubricant for the first and second friction brake elements (42, 44).

6. The self-boosting electromechanical friction brake in accordance with claim 1, wherein the electromechanical actuating device (26, 32, 34, 36, 38) comprises a planetary gear (34, 36, 38).

7. The self-boosting electromechanical friction brake in accordance with claim 1, wherein the electric motor (33) for braking can be operated in a generator mode.

8. The self-boosting electromechanical friction brake in accordance with claim 1, wherein the electromechanical actuating device (26, 32, 34, 36, 38) comprises an electrical energy-storing means.

9. The self-boosting electromechanical friction brake in accordance with claim 1, wherein the brake body (12, 14, 54, 56) comprises coolant channels (54, 56).

* * * * *

UNITED STATES PATENT AND TRADEMARK OFFICE
CERTIFICATE OF CORRECTION

PATENT NO. : 7,000,741 B2
DATED : February 21, 2006
INVENTOR(S) : Dietmar Baumann et al.

It is certified that error appears in the above-identified patent and that said Letters Patent is hereby corrected as shown below:

<u>Title page, Item [54] and Column 1, line 1,</u>
Title, should read as follows:
-- [54]   SELF-BOOSTING ELECTROMECHANICAL VEHICLE BRAKE --.

Signed and Sealed this

Thirtieth Day of May, 2006

JON W. DUDAS
*Director of the United States Patent and Trademark Office*